Feb. 25, 1941.  L. GOLDHAMMER  2,233,006

ROLL FILM CAMERA

Filed Dec. 22, 1938

Inventor
Leo Goldhammer
By His Attorneys

Patented Feb. 25, 1941

2,233,006

UNITED STATES PATENT OFFICE 2,233,006

ROLL FILM CAMERA

Leo Goldhammer, Munich, Germany, assignor, by mesne assignments, to General Aniline & Film Corporation, New York, N. Y., a corporation of Delaware Application December 22, 1938, Serial No. 247,165
In Germany December 23, 1937

2 Claims. (Cl. 95—31)

My present invention relates to a roll film camera provided with a film feeding device which is operatively connected with a device for tensioning the photographic shutter.

It is an object of my invention to provide a mechanism connecting the film feeding device with the device for tensioning the shutter and essentially consisting of a rotatable and displaceable axle advantageously toothed along its entire length.

Another object of this invention is the provision of a mechanism comprising a toothed axle which is connected on the one hand by a rack and a crank wheel drive with the film feeding device and on the other hand by a toothed ring with the tension lever.

A further object of the invention is to provide a toothed axle which is carried in the camera casing rotatably and displaceably, whereas in the shutter housing rotatably only.

Yet another object of the invention is to provide a mechanism comprising a rotatable and displaceable axle, said axle and its guide parts being so long that the focussing of the objective has no influence on the tensioning of the shutter; the said rack which is connected with the film feeding device remains, therefore, continuously connected with the toothed axle though this axle is displaced.

A still further object of the invention is the provision of connecting members which are distinguished from the devices hitherto known of similar kind by requiring very little space.

An additional object of the invention is the provision of such connecting members which are quite located in the interior of the camera, simple in construction and easy to operate.

Other objects and advantages of my present invention will be apparent from the following description.

A preferred embodiment of the subject matter of my invention is represented in the accompanying drawing, in which.

Figure 1:
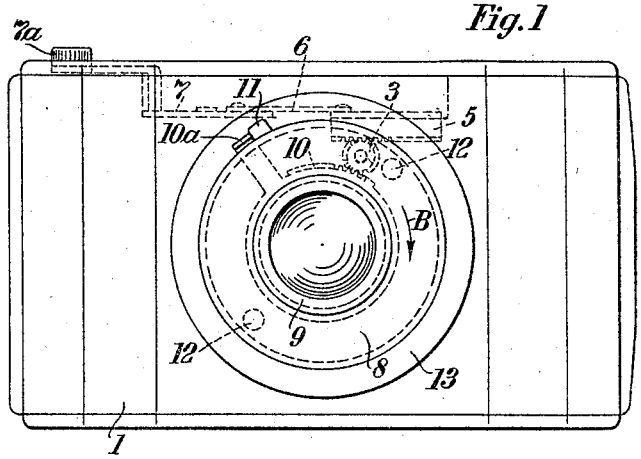
Figure 1 is a front elevational view of a camera having a device for tensioning the objective shutter in accordance with the invention.
Figure 2:
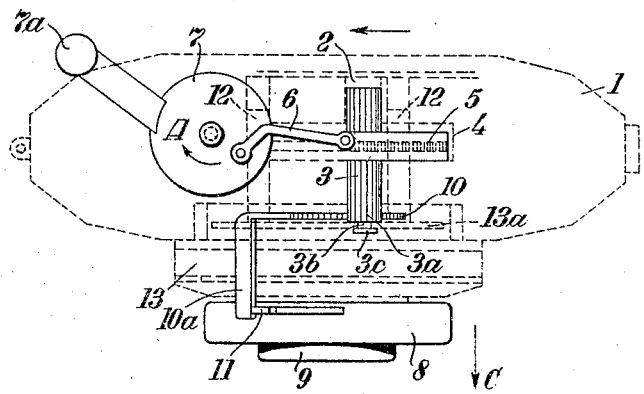
Figure 2 is a top view of the camera as shown in Figure 1.

In the casing 1 of the roll film camera there is arranged on the one hand a bearing 2 for the rotatable, displaceable and toothed axle 3 and on the other hand a slide bearing 4 for the displaceable rack 5. The rack 5 is moved by a traction lever 6 driven by the film feeding crank 7. The film feeding device is operated by a lever 7a. The front end 3a of the axle 3 is rotatably attached to the shutter housing 8 and engages the teeth of a ring 10 lying round the objective tube 9. The ring 10 is provided with an extension 10a the free end of which touches the tension lever 11 of the shutter. If the film feeding device is moved by operating the lever 7a in the direction indicated by the arrow A, the rack 5 will move the toothed axle 3 and the ring 10 in the direction of the arrow B (see Figure 1) whereby the shutter is tensioned by means of the tension lever 11. The objective 9 is guided together with the shutter housing 8 and the tube for adjusting the objective in different distance by means of pins 12 in the camera casing 1. In Figure 2 the objective 9 is not yet in operative position. It can, however, be seen from this Figure 2 that the toothed shaft 3 when the shutter housing and the objective tube are pulled out in the direction of the arrow C continuously remains operatively connected with the rack 5. The guide pins 12 and the throat 3b of the shaft 3 are carried in a ring 13a of the adjusting tube 13, the axle 3 being secured by an extension 3c against movement in axial direction.

I claim:

1. A rollfilm camera of the telescoping focusing front type comprising a camera casing, a film feeding device in said casing, a front member slidably mounted on said casing for movement along the optical axis of the camera, an objective lens and an objective shutter of the setting type mounted on said front, setting mechanism for said shutter including a toothed axle mounted on said front and a cooperating rack mounted in said casing and connected with said film feeding device, whereby said film feeding device and shutter setting mechanism are operatively connected at all times regardless of movement of said front member with respect to said casing.

2. A roll film camera of the telescoping focusing front type comprising a camera casing, a film feeding device in said casing, a front member slidably mounted on said casing for movement along the optical axis of the camera, a lens tube, an objective lens and an objective shutter of the setting type mounted on said front, setting mechanism for said shutter including a shutter tensioning lever, a toothed ring rotatably mounted around said lens tube and having an extension for engaging said tensioning lever, a toothed axle engaging said ring, said axle being rotatably mounted on said front and rotatably and displaceably carried in said casing, and a displaceable rack operatively engaging said axle, said rack being mounted in said casing and connected to said film feeding device, whereby operation of said film feeding device tensions said shutter regardless of the relative position of said front member with respect to said casing.

LEO GOLDHAMMER.